T. H. KENNEY.
DRINKING FOUNTAIN.
APPLICATION FILED NOV. 20, 1913.
1,156,011.
Patented Oct. 5, 1915.
Fig. 1,
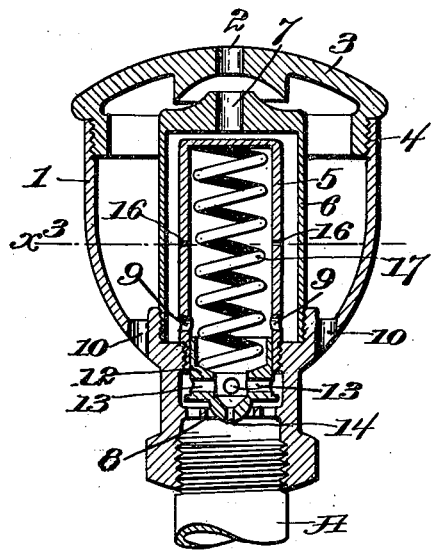
Fig. 2,
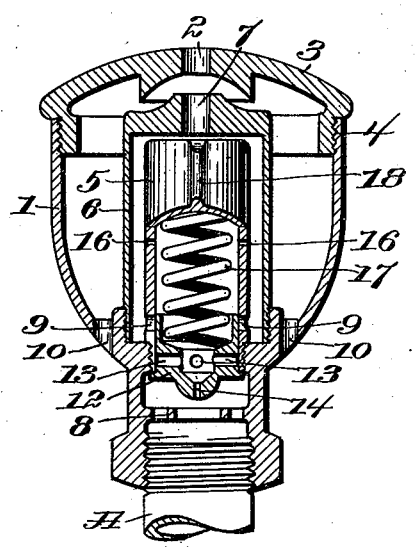
Fig. 3,
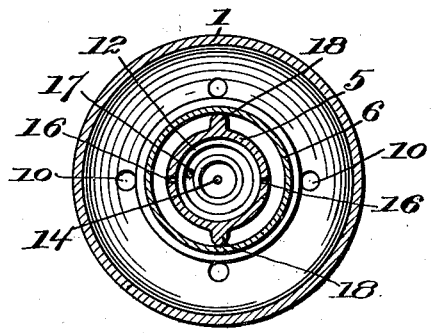
Witnesses:
Jas. J. Maloney
W. E. Coveney
Inventor:
Thomas H. Kenney,
by H. L. Livermore
Att'y

UNITED STATES PATENT OFFICE.

THOMAS H. KENNEY, OF BOSTON, MASSACHUSETTS, ASSIGNOR TO DALTON-INGERSOLL MANUFACTURING COMPANY, A CORPORATION OF MASSACHUSETTS.

DRINKING-FOUNTAIN.

1,156,011. Specification of Letters Patent. Patented Oct. 5, 1915.

Application filed November 20, 1913. Serial No. 802,061.

*To all whom it may concern:*

Be it known that I, THOMAS H. KENNEY, a citizen of the United States, residing in Boston, in the county of Suffolk and State of Massachusetts, have invented an Improvement in Drinking-Fountains, of which the following description, in connection with the accompanying drawings, is a specification, like letters on the drawings representing like parts.

The present invention relates to a drinking fountain in which the flow of water is controlled automatically so that it will not vary when the pressure in the water system varies, the device being arranged, moreover, so that if the final delivery orifice is stopped, no pressure will be accumulated, the water then escaping freely through an overflow.

In accordance with the invention, the direct delivery orifice for the water, which leads directly from a chamber receiving water controlled by an automatic pressure regulating valve, is inclosed in an outer casing which has the final delivery orifice at the top and overflow openings near the bottom. The final delivery orifice is in alinement with the direct orifice, and the pressure is so regulated that when the water is flowing, a jet of water will pass across from the direct orifice through the final delivery orifice with sufficient force to bubble over and supply the quantity of water necessary for drinking easily. If, however, the final delivery orifice should be stopped, no material pressure will accumulate behind it, as there is an open space between the direct orifice and the final delivery orifice which allows the trapped water to escape into the inclosing case from which it flows through the openings at the bottom.

Figure 1 is a vertical section of a drinking fountain embodying the invention; Fig. 2 is a similar view showing the parts in the position which they reach when the pressure is abnormally high; and Fig. 3 is a horizontal section on the line $x^3$ of Fig. 1.

Referring to Fig. 1, the inlet pipe A enters the main casing 1 which constitutes the inclosing and overflow chamber, and is provided with the final delivery orifice 2, which is merely an opening through the cover 3 of the casing 1, which is shown as secured to the body of the casing by means of screw threads 4. The inlet pipe A opens directly into a closed bell 5 which is surrounded by a chamber 6 which has an opening 7 at the top in alinement with the final delivery orifice 2, said opening constituting the direct or primary orifice for the water from the source of supply.

The water from the pipe A enters the bell 5 through openings in a bridge or spider 8 at the bottom of the said bell, and under normal low pressure passes freely through lateral openings 9 in the wall of the bell to the interior of the chamber 6, the parts being so proportioned that, under all conditions there will be sufficient water pressure to cause a stream to flow through the orifice 7 with sufficient force to bubble out through the orifice 2. Whatever water fails to pass through the orifice 2 is caught in the outer casing 1 and runs away through the waste openings 10 which are formed around the bottom of the chamber. This construction renders it impossible for any mischievous person to spray water any distance by stopping the orifice tube, since when said orifice is stopped the pressure is relieved by the overflow of the water into the outside casing 1 from which it has free egress through the openings 10.

In order to control the pressure so that under all pressure conditions in the water main from which the drinking fountain is supplied, the outflow will be substantially the same, the flow of water from the supply pipe A into the chamber 6 is automatically controlled. To accomplish this, the bell 5 within the chamber 6 is provided with a piston or plunger 12 which approximately fits the said bell and is provided with relatively large lateral openings 13 and a smaller longitudinal opening 14, the lateral openings 13 being so positioned that if the plunger 12 rises, the said openings will be closed by the walls of the bell 5. The said bell 5, moreover, is provided with the relatively large lateral openings 9 which are adapted to be closed when the plunger 12 rises, and relatively small openings 16 which are open all the time. The water entering through the pipe A acts upon the lower area of the plunger 12, but if the pressure is low, the water will pass around the plunger 12, in through the lateral openings 13 and out through the lateral openings 9, thus freely flowing into the chamber 6 and passing out through the orifice 7 with sufficient force to supply the final delivery orifice 2. If, however, the pressure in the water-main increases, the plunger 12 will be lifted toward the position shown in Fig. 2, and in such upward movement against the stress of the spring 17, the lateral openings 13, as well as the lateral openings 9, will be gradually throttled, thus cutting down the supply of water to correspond to the increase in pressure.

In Fig. 2, the plunger is shown in its extreme high pressure position in which the lateral openings 13, as well as the lateral openings 9 are wholly closed, in which case the water can only flow through the small vertical passage 14 through the plunger, and the small lateral passages 16 through the bell.

It will be seen from the foregoing description that the strength of the spring 17, and the area of the several ports or passages can be readily designed to take care of any existing pressure differences in a water system, so that an approximately even stream will be delivered through the final delivery orifice under all conditions. Furthermore, if the final delivery orifice should be partially stopped, or wholly stopped, the water will merely waste through the openings 10.

In constructing the device, both the bell 5 and the chamber 6 are shown as screwed into the main casing which forms the outer chamber, the said outer chamber being in the form of a shell which is closed by a screw top which contains the final delivery orifice 2. The bell 5 is shown in Figs. 2 and 3 as provided with ribs 18 which tend to direct the water toward the orifice 7 and prevent swirling.

What I claim is:

In a drinking fountain, the combination with a chamber provided with an inlet pipe at one end and a direct delivery orifice at the opposite end; of a closed bell within said chamber, the lower end of said bell being in direct communication with the inlet pipe and the walls of said bell being provided with lateral ports at different levels; a plunger extending into the bottom of said bell and being acted upon by the water entering from the inlet pipe, the said plunger having a permanently open port, leading to the interior of the bell and lateral ports adapted to be opened or closed in response to a movement of the plunger out of or into the bell, the outer wall of said plunger being so situated as to open and close one set of ports through the wall of the bell; and a spring located within the bell and adapted to act upon the plunger, substantially as described.

In testimony whereof, I have signed my name to this specification in the presence of two subscribing witnesses.

THOMAS H. KENNEY.

Witnesses:
JAS. J. MALONEY,
M. L. MALONEY.